(12) United States Patent
Kincaid et al.

(10) Patent No.: US 8,529,657 B2
(45) Date of Patent: Sep. 10, 2013

(54) POROUS VENT BREATHER

(75) Inventors: Jeffrey Lee Kincaid, Clarkston, MI (US); Mark Andrew Schneider, Farmington Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 233 days.

(21) Appl. No.: 13/222,244

(22) Filed: Aug. 31, 2011

(65) Prior Publication Data

US 2013/0047780 A1  Feb. 28, 2013

(51) Int. Cl.
*B01D 46/00* (2006.01)

(52) U.S. Cl.
USPC .......... 55/385.3; 55/385.4; 55/505; 74/606 A; 454/69; 403/31; 403/38

(58) Field of Classification Search
USPC ............ 55/385.4, 385.3, 505, 510, 320, 327, 55/329, 490, 504, 417; 74/606 R, 607; 220/371, 373, 374; 137/171, 197, 198, 493, 137/540, 543.17, 543.19, 583; 403/31, 38, 403/150, 162; 138/42
See application file for complete search history.

(56) References Cited

U.S. PATENT DOCUMENTS

| | | | |
|---|---|---|---|
| 3,092,091 A | 6/1963 | Bosley | |
| 4,245,592 A | 1/1981 | Atkins, Sr. | |
| 4,554,844 A | 11/1985 | Hamano | |
| 4,595,118 A | 6/1986 | Azuma et al. | |
| 5,129,422 A | 7/1992 | Davison, Jr. et al. | |
| 5,409,526 A * | 4/1995 | Zheng et al. | 96/132 |
| 5,509,949 A | 4/1996 | Gluys et al. | |
| 5,724,864 A | 3/1998 | Rodgers et al. | |
| 6,015,444 A | 1/2000 | Craft et al. | |
| 6,058,969 A | 5/2000 | Bollwahn et al. | |
| 6,279,247 B1 * | 8/2001 | Neitzel | 33/727 |
| 6,447,565 B1 | 9/2002 | Raszkowski et al. | |
| 7,025,175 B1 | 4/2006 | Pate | |
| 7,517,392 B2 * | 4/2009 | Neff et al. | 95/272 |

(Continued)

FOREIGN PATENT DOCUMENTS

| | | |
|---|---|---|
| GB | 2441404 A | 3/2008 |
| JP | 8128552 A | 5/1996 |

OTHER PUBLICATIONS

Sintered Mufflers and Breather Vents offered by Allied Group, Inc., 2011.
Coalescing Filter, Compressed Air Filters, Natural Gas Filters, and Air Oil Separation by Allied Group, Inc., 2011.
Sintered Porous Metal Products from Allied Porous Technologies, Inc, 2011.

(Continued)

*Primary Examiner* — Duane Smith
*Assistant Examiner* — Minh-Chau Pham
(74) *Attorney, Agent, or Firm* — Harness, Dickey & Pierce, P.L.C.

(57) ABSTRACT

A vent for an axle housing includes a first body portion and a second body portion. The first body portion has a plurality of pores defined therethrough. The first body portion defines a first cavity. The second body portion has a conical portion that extends between a throat and a neck portion that defines an opening. The second body portion defines a second cavity that fluidly connects with the first cavity. The vent permits air to pass from the axle housing, through the plurality of pores in the first body portion, through the first and second cavities, and out the opening of the neck portion while concurrently inhibiting egress of lubricant from the axle housing.

20 Claims, 4 Drawing Sheets

(56) References Cited

U.S. PATENT DOCUMENTS

| | | | |
|---|---|---|---|
| 7,604,020 B2* | 10/2009 | Kennedy | 137/197 |
| 8,409,313 B2* | 4/2013 | Vivian et al. | 55/385.4 |
| 8,425,643 B2* | 4/2013 | Vivian et al. | 55/462 |
| 2002/0005191 A1 | 1/2002 | Maeda et al. | |
| 2004/0003846 A1 | 1/2004 | Seidl | |
| 2004/0025942 A1 | 2/2004 | Kim | |
| 2012/0003915 A1* | 1/2012 | Sinha | 454/237 |
| 2012/0295140 A1* | 11/2012 | Cho et al. | 429/54 |

OTHER PUBLICATIONS

Stainless Filters, Powder Metal, Metal Injection Molding from SSI Technologies, Inc., 2008.

Porous Metal Design Guidebook, Metal Powder Industries Federation, 2011.

\* cited by examiner

POROUS VENT BREATHER

FIELD

The present disclosure relates generally to axle housings. More particularly, the present disclosure is directed to a vent incorporated on an axle housing and configured for permitting air to escape the axle housing while concurrently inhibiting fluid particles such as lubricant from escaping the axle housing.

BACKGROUND

This section provides background information related to the present disclosure which is not necessarily prior art.

Breather vents are used in axle assemblies to prevent pressure build-up during temperature changes. Temperatures can range from −40° Fahrenheit to 350° Fahrenheit. Without proper ventilation, pressures within the axle can range from vacuums of −5 psi to pressures of 8 psi. Both positive and negative pressure can affect the axle sealing performance. As an axle heats up, the internal pressure builds. If lubricant is present near a vent, the pressure build-up can push the lubricant through the vent, commonly referred to as "vent expulsion". One known vent configuration includes a free breathing vent tube that is routed from an axle housing to a location on a vehicle generally away from the axle housing and elevated. Such vent tube configurations can add extra piece cost and assembly cost. It can also be difficult to package the vent tubes in certain vehicle applications. Other vent configurations include "pop-off" vents or "jiggle cap" vents that both allow air to leave the axle housing as pressure is increased, but prevent entry of water or other contaminants. In some configurations, pop-off vents can result in some pressure build-up within the axle. Vent expulsion is also a common concern. Vent expulsion concerns can result in significant development time and manufacturing cost for the addition of baffle systems. Other vents include Gore® membrane style vents that allow gasses to pass through the vent but not liquids. However, Gore® membrane vents can be expensive and subject to clogging concerns.

SUMMARY

This section provides a general summary of the disclosure, and is not a comprehensive disclosure of its full scope or all of its features.

A vent for an axle housing includes a first body portion and a second body portion. The first body portion has a plurality of pores defined therethrough. The first body portion defines a first cavity. The second body portion has a conical portion that extends between a throat and a neck portion that defines an opening. The second body portion defines a second cavity that fluidly connects with the first cavity. The vent permits air to pass from the axle housing, through the plurality of pores in the first body portion, through the first and second cavities, and out the opening of the neck portion while concurrently inhibiting egress of lubricant from the axle housing.

According to additional features, the first body portion includes a closed end wall. The opening of the neck portion is generally coaxial with a passage defined by the throat. The second body portion further defines a bulbous portion that connects the conical portion and the neck portion. The bulbous portion has an inner dimension greater than the first body portion. The opening of the neck portion has a first diameter. The bulbous portion has a second diameter. The first diameter is less than the second diameter.

According to still other features, the first body portion includes a first connection portion. The second body portion includes a second connection portion. The first and second connection portions are selectively coupled in an assembled position. One of the first and second connection portions includes male threads. The other of the connection portions includes female threads. The first body portion is formed of porous powdered metal. The first body portion is cylindrical.

According to other features, the bulbous portion and conical portion collectively form a closed sidewall structure that is disposed intermediate the throat and the neck portion. The closed sidewall structure and conical geometry is particularly suited to collect lubricant and direct it back through the throat.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The present invention will become more fully understood from the detailed description and the accompanying drawings wherein.

Figures 3, 4:
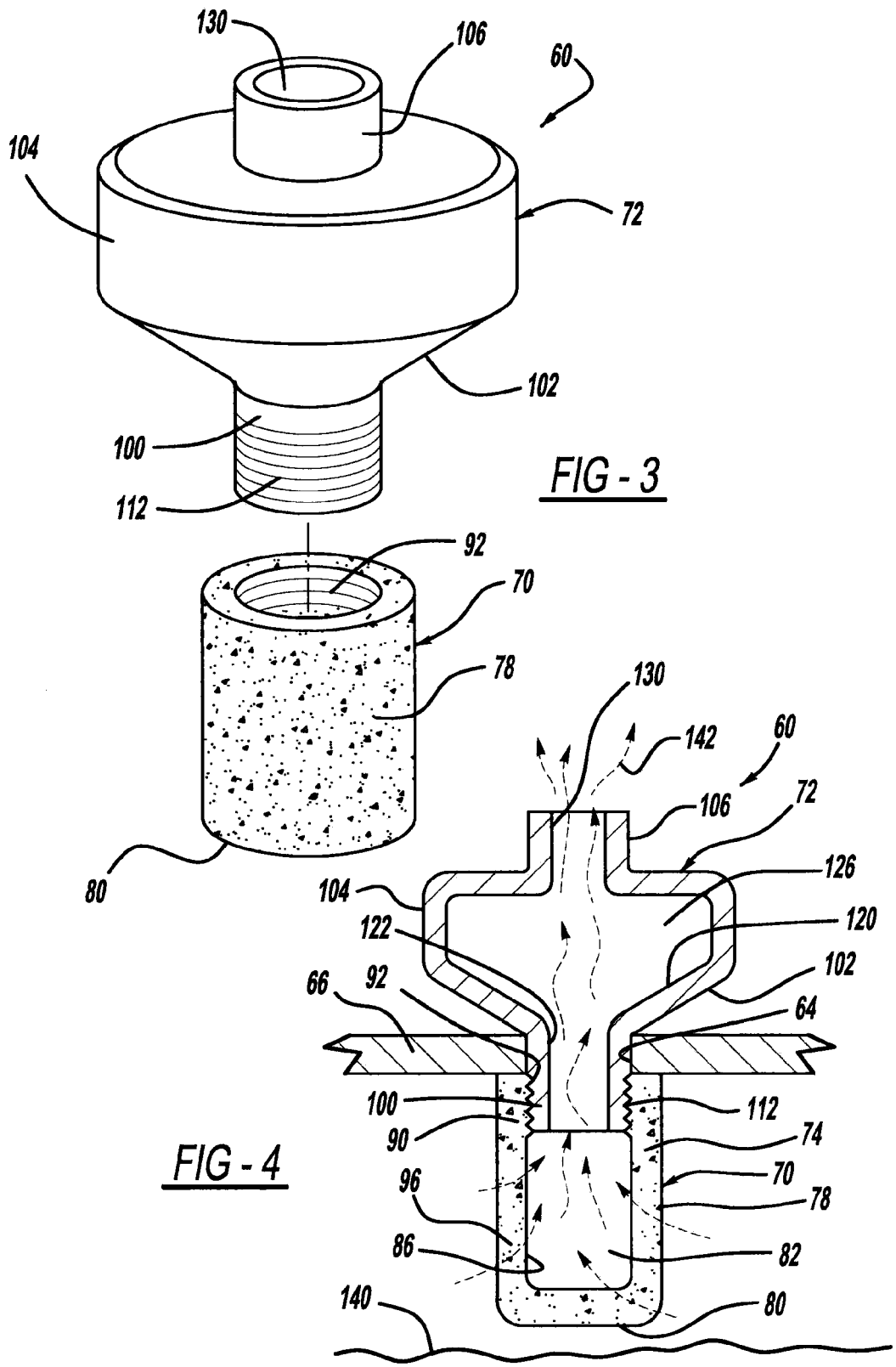
FIG. 3 is an exploded perspective view of the vent constructed in accordance to one example of the present teachings and including a first body portion and a second body portion.
Figure 5:
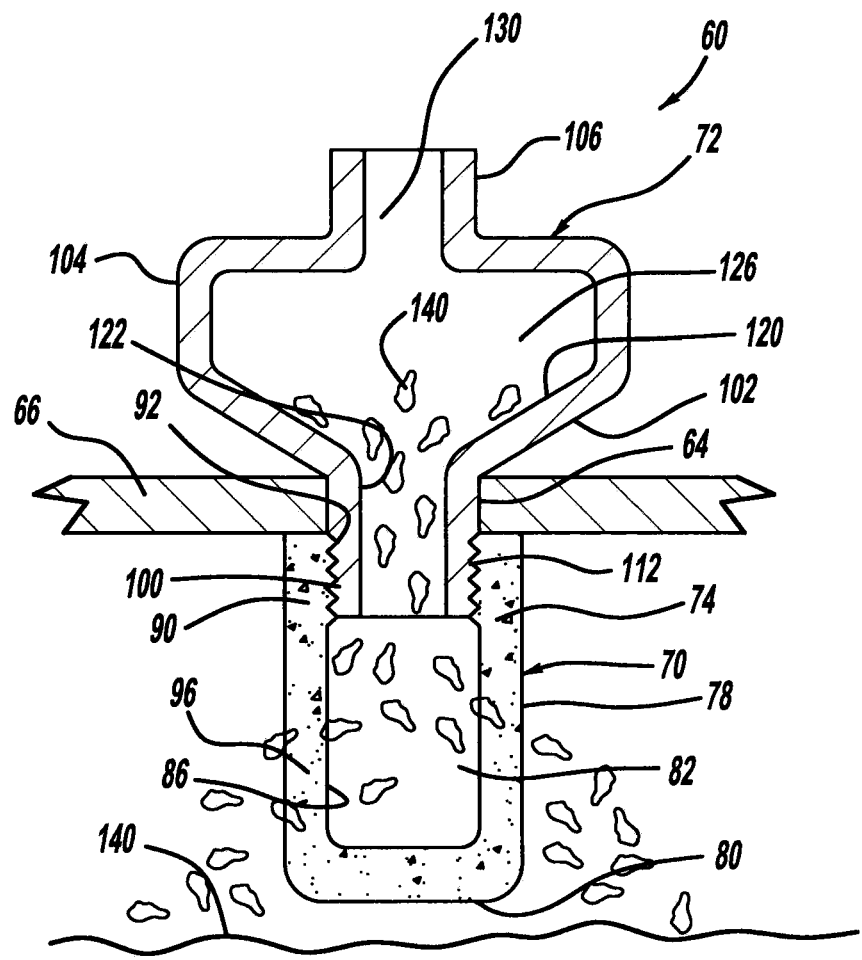

FIG. 4 is a cross-sectional view of the vent shown assembled in the housing of the rear differential according to one configuration and illustrating air that is permitted to escape from within the housing, through the vent, and into the atmosphere; and FIG. 5 is a cross-sectional view of the vent as shown in FIG. 4 and illustrating fluid or lubricant that is permitted to pass through the porous material of the first body portion and be collected in a second cavity defined in the second body portion where the lubricant is directed back down a conical surface of the second body portion and back into the axle housing.

Corresponding reference numerals indicate corresponding parts throughout the several views of the drawings.

DETAILED DESCRIPTION

Example embodiments will now be described more fully with reference to the accompanying drawings.

The following description of the preferred embodiments is merely exemplary in nature and is in no way intended to limit the invention, its application, or uses.

The present invention is directed to a vent that may be incorporated on a housing structure of a vehicle driveline component. The exemplary vehicle driveline component shown and described herein is a differential associated with a rear axle assembly. It will be appreciated, however, that the vent may also be configured for use with any other housing of a vehicle driveline component such as, but not limited to, transmissions, transfer cases, front axle assemblies, and power transfer units. Accordingly, while the present invention is hereinafter described in association with a specific structural embodiment for use in a rear differential, it should be understood that the arrangement shown and described is merely intended to illustrate an exemplary embodiment of the present invention.

Figure 1:
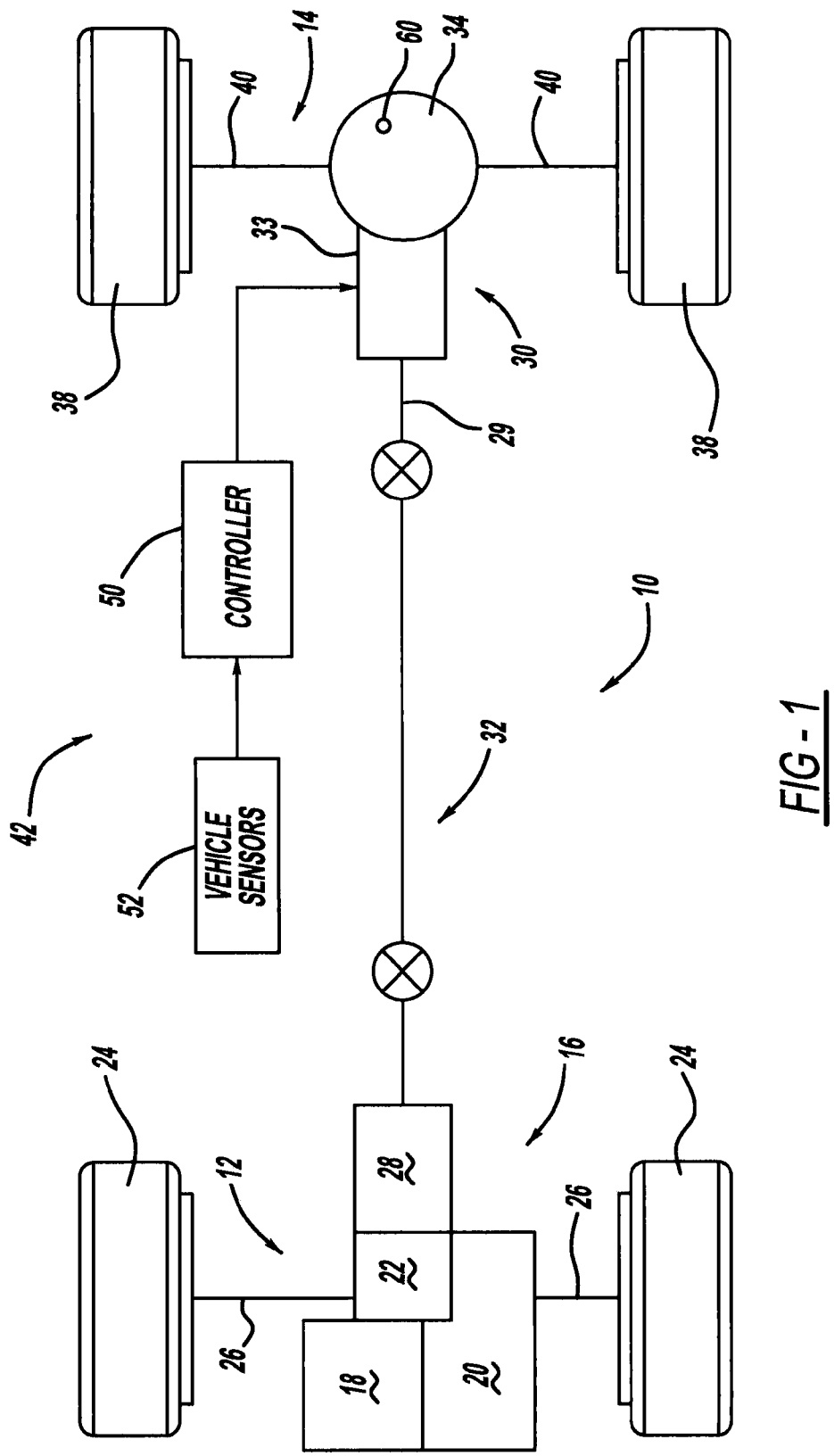
FIG. 1 is a schematic of a four-wheel drive vehicle equipped with a rear axle assembly having a rear differential incorporating a vent constructed in accordance to one example of the present teachings.
Figure 2:
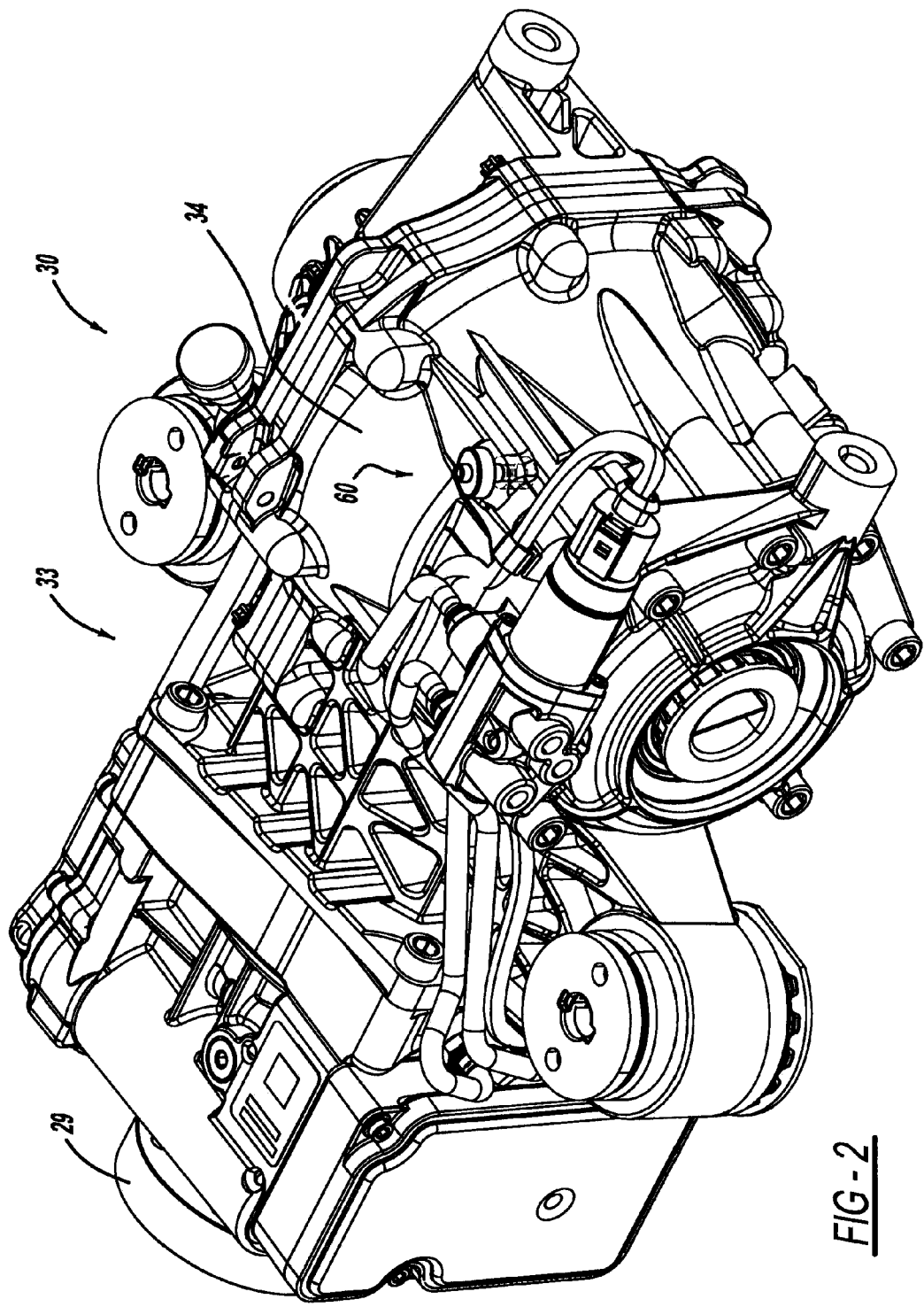
FIG. 2 is a perspective view of an exemplary power transmission device associated with the rear axle assembly and which includes the rear differential incorporating the vent of the present teachings according to one implementation.

With initial reference to FIGS. 1 and 2 of the drawings, an exemplary drive train 10 for a four-wheel drive vehicle is shown. The drive train 10 includes a first axle assembly 12, a second axle assembly 14, and a powertrain assembly 16 for generating and delivering drive torque to the axle assemblies 12 and 14, respectively. In the particular arrangement shown, the first axle assembly 12 is the front axle while the second axle assembly 14 is the rear axle. The powertrain assembly 16 includes an engine 18 and a multi-speed transmission 20 having an integrated front differential unit 22 for driving front wheels 24 via front axle shafts 26. The powertrain assembly 16 further includes a transfer unit 28 driven by the transmission 20 for delivering torque to an input member 29 of a power transmission device 30 via a drive shaft assembly 32. The power transmission device 30 generally includes a torque transfer device 33 and a rear differential 34. The input member 29 of the power transmission device 30 corresponds to an input member of the torque transfer device 33 and is coupled to the drive shaft assembly 32. An output member (not specifically shown) of the torque transfer device 33 is arranged to drive the rear differential 34. The torque transfer device further includes a selectively engageable clutch unit (not specifically shown) operable to selectively couple the input member 29 to the output member. The second axle assembly 14 also includes a pair of wheels 38 that are connected to the rear differential 34 via rear axle shafts 40.

The drive train 10 is shown to include an electrically-controlled power transfer system 42 that includes the power transmission device 30. The power transfer system 42 is operable to selectively provide drive torque in a two-wheel drive mode or a four-wheel drive mode. In the two-wheel drive mode, torque is not transferred to the rear differential 34 via the torque transfer device 33 of the power transmission device 30. Accordingly, one hundred percent of the drive torque delivered by the transmission 20 is provided to the front wheels 24. In the four-wheel drive mode, power is transferred through the torque transfer device 33 of the power transmission device 30 to the rear differential 34 to supply drive torque to the rear wheels 38. The power transfer system 42 further includes a controller 50 that is in communication with vehicle sensors 52 for detecting dynamic and operational characteristics of the motor vehicle. The vehicle sensors 52 can include, but are not limited to, sensors that can determine wheel speed and other characteristics.

With continued reference to FIGS. 1 and 2, and additional reference now to FIGS. 3-5, a vent 60 constructed in accordance to one example of the present teachings will be described. The vent 60 is shown mounted relative to an opening 64 (FIG. 4) in a housing 66 of the rear differential 34. The vent 60 generally comprises a first body portion 70 and a second body portion 72. In the example provided, the first body portion 70 and the second body portion 72 can be removably coupled relative to each other as described more fully herein. The first body portion 70 generally includes a cylindrical portion 74 formed by an outer cylindrical wall 78 and an end wall 80. The cylindrical portion 74 generally defines a first cavity 82. The cylindrical portion 74 further includes an inner wall 86. The first body portion 70 includes a first connecting portion 90 on an open end opposite the end wall 80. In the example shown, the first connecting portion 90 includes female threads 92. The first body portion 70 is made of a porous material that defines a plurality of pores 96 therethrough. As used herein, the term "pores" is used to denote passages or holes. The pores may define passages of sufficient size to preclude clogging while staying saturated with oil. In some examples, the pores can be around 0.5 mm in diameter or larger. Other dimensions are contemplated. The cylindrical portion 74 can be formed of porous powdered metal or other material such as a solid cylindrical portion having a plurality of holes drilled therethrough. Other materials may be employed such as, but not limited to, polymers, metals and ceramics. Preferably, the material is selected that provides favorable properties that encourage oil to fall off of or be shed from it. It will be appreciated however that the cylindrical portion 74 can be formed in a number of ways that can establish pores that generally connect the outer cylindrical wall 78 with the inner wall 86 for allowing air to pass therethrough.

The second body portion 72 generally includes a second connecting portion 100, a conical portion 102, a bulbous portion 104, and a neck portion 106. In the example shown, the second connecting portion 100 includes male threads 112 that are configured to threadably mate with the female threads 92 of the first body portion 70. The conical portion 102 generally includes a conical wall 120 that slopes toward a throat 122 that extends through the second connecting portion 100. The bulbous portion 104 cooperates with the conical portion 102 to define a second cavity or air expansion chamber 126. The conical portion 102 and the bulbous portion 104 collectively form a closed sidewall structure. The closed sidewall structure is particularly suited to collect lubricant and direct it back through the throat 122 as will become appreciated herein. The bulbous portion 104 has an inner dimension that is greater than the first body portion 70. The neck portion 106 includes an outlet port 130. The outlet port 130 has a smaller diameter than the bulbous portion 104.

While the vent 60 has been shown and described as two distinct pieces, the first body portion 70 and the second body portion 72, the vent 60 may include a unitary piece or alternatively more than two separate pieces. Moreover, while the first connecting portion 90 has been described as having female threads 92 and the second connecting portion 100 has been described as having male threads 112, these features may be reversed. Furthermore, other connecting structures may be used to couple the first body portion 70 to the second body portion 72. The second body portion 72 can be formed of rigid material, such as metal.

In the example shown in FIGS. 4 and 5, the second connecting portion 100 of the second body portion 72 is shown inserted through the opening 64 of the housing 66. The first connecting portion 90 is shown within the housing 66 of the rear differential 34. In this regard, the mating connection between the male threads 112 of the second connecting portion 100 and the female threads 92 of the first connecting portion 90 is shown generally within the housing 66. The connection can be made elsewhere, such as outside of the housing 66 and/or at the opening 64. Nevertheless, the first body portion 70 is coupled to the second body portion 72 such that lubrication 140 is below the end wall 80 of the cylindrical portion 74 (as shown) or at an elevation that extends through the outer cylindrical wall 78 of the first body portion 70.

In use, the vent 60 permits air 142 (FIG. 4) to escape from within the housing 66 to atmosphere. More specifically, air 142 can pass through the pores 96 of the first body portion 70, up through the throat 122 of the second body portion 72, through the second cavity 126 and out the outlet port 130 of the neck portion 106. In the example shown, the throat 122 is generally coaxial with the outlet port 130. With reference to FIG. 5, lubrication 140 is permitted to pass through the pores 96 of the first body portion 70. It will be appreciated that lubrication 140 can be directed through the pores 96 such as during normal vehicle operation such as acceleration, deceleration, turning, etc. The lubrication 140 may also have enough inertia to travel from the first cavity 82 in the first body portion 70 up through the throat 122 of the second body portion 72 and into the second cavity 126 of the second body portion 72.

The second cavity 126 provides a geometry that allows the lubrication to generally collect and be guided down the conical wall 120 and back through the throat 122 by the influence of gravity. The second cavity 126 of the second body portion 72, therefore, provides a secondary collection zone downstream of the first body portion 70 to provide a secondary means of discouraging or inhibiting the lubrication 140 from escaping the housing 66 of the rear differential 34. While FIG. 4 has been shown illustrating air flow and FIG. 5 has been shown illustrating lubrication 140 for clarity, these events can occur concurrently.

In some examples, the throat 122 of the first body portion can be received by the opening 64 of the housing 66. In other examples, some of the cylindrical portion 74 of the first body portion 70 can extend partially into the opening 64 of the housing 66. Alternatively, some of the cylindrical portion 74 can extend proud from the opening 64 of the housing 66. Other configurations are contemplated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A vent for an axle housing, the vent comprising:
   a first body portion having a plurality of pores defined therethrough, the first body portion defining a first cavity; and
   a second body portion having a throat, a neck portion and a conical portion that extends between the throat and the neck portion, the throat being directly mounted to and in fluid communication with the first body portion, the neck portion defining an outlet port, the conical portion diverging outwardly from the throat with decreasing distance to the neck portion, the second body portion defining a second cavity that fluidly connects with the first cavity.

2. The vent of claim 1 wherein the first body portion includes an end wall that closes the first body portion on an end opposite the throat.

3. The vent of claim 1 wherein the outlet port in the neck portion is generally coaxial with a passage defined by the throat.

4. The vent of claim 3 wherein the second body portion further defines a bulbous portion that connects the conical portion and the neck portion, wherein the bulbous portion has an inner dimension greater than the first body portion.

5. The vent of claim 4 wherein the outlet port in the neck portion has a first diameter and wherein the bulbous portion has a second diameter, the first diameter being less than the second diameter.

6. The vent of claim 1 wherein one of the first body portion and the throat includes male threads and wherein the other of the first body portion and the throat includes female threads that are threadably coupled to the male threads.

7. The vent of claim 1 wherein the first body portion is formed of porous powdered metal.

8. The vent of claim 1 wherein the first body portion is cylindrical.

9. A vent for an axle housing, the vent comprising:
   a first body portion formed of a porous material and defining an outer cylindrical wall, an end wall, which closes a first end of the outer cylindrical wall, and a first connection portion that is formed on a second, opposite end of the outer cylindrical wall; and
   a second body portion having a throat, a conical portion, and a neck portion, the throat defining an inlet, which is in fluid communication with the first body portion, and a second connection portion that is coupled to the first connection portion, the conical portion being disposed between the throat and the neck portion such that a narrow end of the conical portion is disposed closer to the throat than the neck portion, and a wider end of the conical portion is disposed closer to the neck portion than the throat the neck portion defining an outlet that is coaxial with the inlet.

10. The vent of claim 9 wherein the second body portion further includes a bulbous portion that connects the conical portion with the neck portion.

11. The vent of claim 10 wherein the bulbous portion has an inner dimension greater than the first porous body portion.

12. The vent of claim 11 wherein the outlet has a first diameter and wherein the bulbous portion has a second diameter, the first diameter being less than the second diameter.

13. The vent of claim 9 wherein the first body portion is formed of powdered metal.

14. The vent of claim 9, wherein the first and second connection portions are releasably coupled together.

15. The vent of claim 14 wherein one of the first and second connection portions includes male threads and the other of the connection portions includes female threads that are threadably engaged to the male threads.

16. A vent for an axle housing, the vent comprising:
a first body portion formed by an outer cylindrical wall having a closed end and an opposite end that includes a first connection portion formed thereon, the outer cylindrical wall being formed of a porous material; and
a second body portion formed by a bulbous portion and a conical portion that cooperate to form a sidewall structure disposed intermediate a throat and a neck portion with the conical portion being disposed closer to the throat than the neck portion and the bulbous portion being disposed closer to the neck portion than the throat, the throat and the neck portion each defining an associated opening that are coaxial with one another, the second body portion further including a second connection portion formed thereon, the second connection portion being releasably coupled to the first connection portion such that the second body portion is in fluid communication with the first body portion
wherein the conical portion is oriented such that a liquid lubricant that collects in the sidewall structure drains into the opening in the throat and wherein the opening in the neck portion is an outlet of the vent.

17. The vent of claim 16 wherein the bulbous portion has an inner dimension greater than the first porous body portion.

18. The vent of claim 17 wherein the opening in the neck portion has a first diameter and wherein the bulbous portion has a second diameter, the first diameter being less than the second diameter.

19. The vent of claim 16 wherein one of the first and second connection portions includes male threads and the other of the connection portions includes female threads.

20. The vent of claim 16 wherein the outer cylindrical wall is formed of powdered metal.

* * * * *